United States Patent [19]

Sakai

[11] Patent Number: 4,809,564
[45] Date of Patent: Mar. 7, 1989

[54] CONTROL SYSTEM OF A SELECTOR MECHANISM FOR A CONTINUOUSLY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 94,003

[22] Filed: Sep. 4, 1987

[30] Foreign Application Priority Data

Sep. 12, 1986 [JP] Japan ................. 61-216885

[51] Int. Cl.$^4$ ............................................. F16H 37/08
[52] U.S. Cl. ........................................ 74/689; 474/1
[58] Field of Search ............... 474/1, 2; 192/47.8, 192/51

[56] References Cited

U.S. PATENT DOCUMENTS

| | | | |
|---|---|---|---|
| 4,459,872 | 7/1984 | Tibbles | 74/689 X |
| 4,489,622 | 12/1984 | Underwood | 192/51 X |
| 4,570,768 | 2/1986 | Nishimura et al. | 192/51 X |
| 4,653,621 | 3/1987 | Oshiage | 192/0.076 X |
| 4,673,377 | 6/1987 | Akutagawa | 474/1 |
| 4,704,097 | 11/1987 | Sakai | 474/28 |

FOREIGN PATENT DOCUMENTS

A0151024 8/1985 European Pat. Off.
60-159452 8/1985 Japan.

Primary Examiner—David A. Scherbel
Assistant Examiner—Creighton Smith
Attorney, Agent, or Firm—Martin A. Farber

[57] ABSTRACT

A control system for a selector mechanism for a vehicle provided with a clutch and a continuously variable transmission having operational ranges such as driving range and a reverse range. A synchronizer is provided for selecting either of forward and reverse gears. A hydraulic actuator is provided to respond to the operation of a selector lever for operating the synchronizer for the selection of the ranges. A control unit is provided to respond to the selection of the range for engaging the clutch with a delay time after engagement of the synchronizer.

6 Claims, 6 Drawing Sheets

CONTROL SYSTEM OF A SELECTOR MECHANISM FOR A CONTINUOUSLY VARIABLE TRANSMISSION

BACKGROUND OF THE INVENTION

The present invention relates to a selector mechanism for a continuously variable belt-drive automatic transmission for a vehicle, and particularly to a mechanism for performing the selection of operational ranges of the automatic transmission.

A known continuously variable belt-drive transmission (called hereinafter CVT) comprises an endless belt running over a drive pulley and a driven pulley. Each pulley comprises a movable conical disc which is axially moved by a fluid operated servo device so as to vary the running diameter of the belt on the pulleys in dependency on driving conditions. Further, a selector mechanism is provided for selecting operational ranges such as a drive range (D), high engine speed drive range (Ds), reverse range (R), neutral range (N), and parking range (P). The selection of these ranges are performed by manipulating a selector lever Thus, a driving position (D range) and a reverse driving position (R range), neutral position and parking position are provided for the selector lever.

European Patent Application EP-A-0 151 024 discloses a CVT in which a selector mechanism having a synchromesh mechanism is provided between an electromagnetic clutch and an input shaft of a belt and pulley device The selector mechanism has a manually operated selector lever mechanically connected thereto through a link mechanism.

In order to reduce the shifting effort, there has been proposed a selector mechanism operated by a hydraulic actuator which is connected to the selector lever. When the selector lever is operated, the actuator operates to shift a part of the synchromesh mechanism such as a fork or sleeve to engage the synchromesh mechanism. In such a system, the selector lever can be operated regardless of the engagement of the synchromesh mechanism.

Generally, the CVT is so arranged that when the selector lever is shifted from the neutral position to the driving position and to the reverse position, drag current flows in a magnetizing coil of the electromagnetic clutch to apply drag torque to the drive pulley to remove clearances in the transmission.

On the other hand, it may occur that, on shifting the selector lever, time elapses before the sleeve of the synchromesh mechanism engages with a corresponding gear in synchronism with it. Accordingly, it may happen that the electromagnetic clutch engages before the engagement of the synchromesh mechanism. When the electromagnetic clutch engages, the drag torque is applied. Therefore, it is difficult to engage the synchromesh mechanism. Further, the selector lever may be shifted to the neutral position during driving of the vehicle and shifted again to the driving position. In such a case, the actuator fails to engage the synchromesh mechanism, because of a large difference between the speeds of the sleeve and the corresponding gear.

SUMMARY OF THE INVENTION

The object of the present invention is to provide a selector mechanism which is operated by an actuator without failure in the engagement of a synchromesh mechanism.

According to the present invention, there is provided a control system for a selector mechanism for a vehicle provided with a clutch and a continuously variable transmission having a driving range, a reverse range, a neutral range, and a parking range, mean including a synchronizer for selecting either of forward and reverse gears and a selector lever arranged to be shifted so as to perform the selection of the ranges.

The system comprises an actuator responsive to the operation of the selector lever for operating the synchronizer for the selection of the ranges, detector means for detecting a selected range and for producing a range signal, control means responsive to range signal for engaging the clutch with a delay time after engagement of the synchronizer.

The clutch is an electromagnetic clutch, and the actuator is a hydraulic actuator. The system further can comprise a selector valve responsive to the operation of the selector lever for operating the hydraulic actuator.

The other objects and features of this invention will become understood from the following description with reference to the accompanying drawings.

DETAILED DESCRIPTION OF THE PREFERRED EMBODIMENT

Figure 1A:
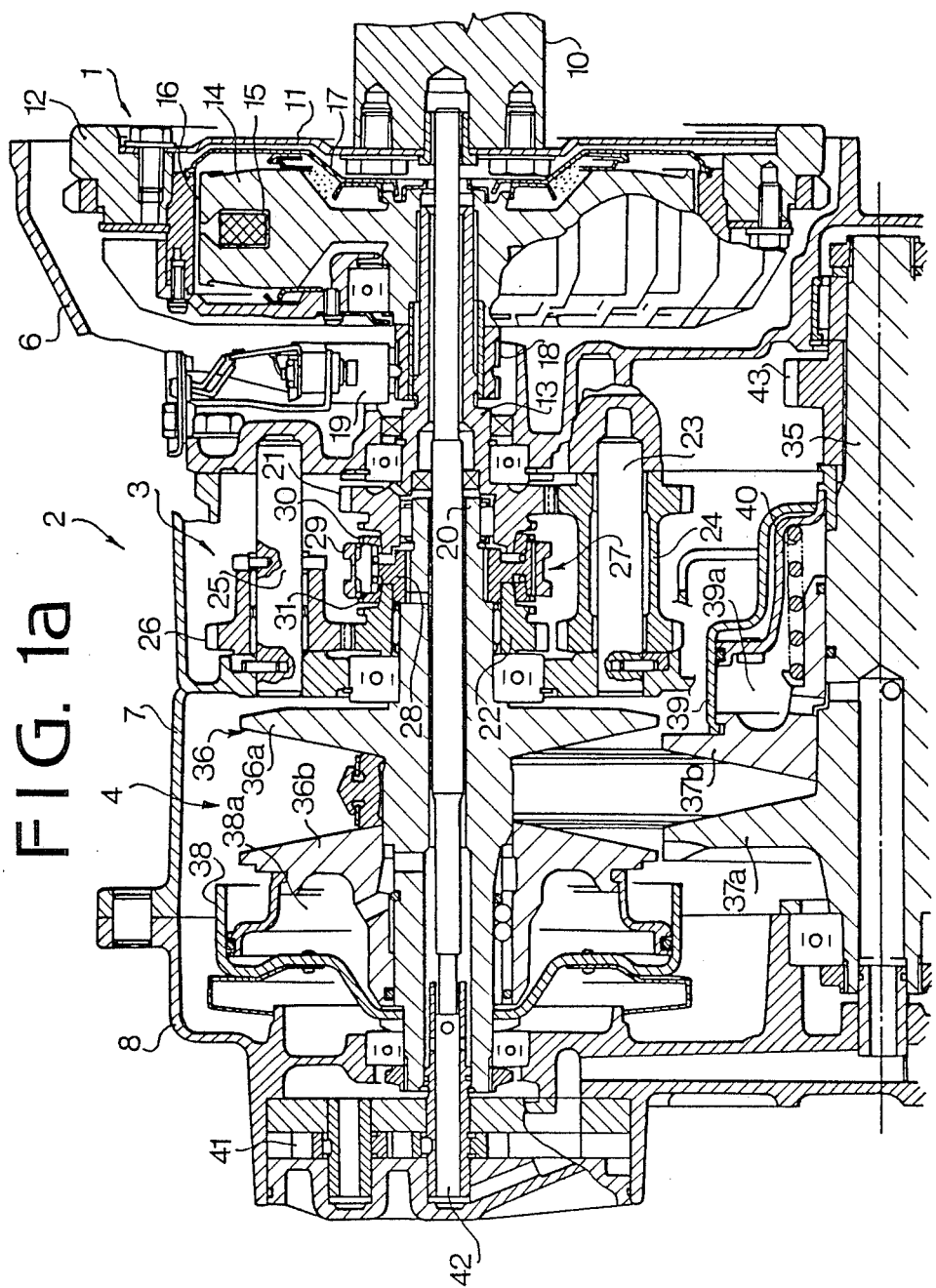
FIGS. 1a and 1b show a continuously variable belt-drive transmission to which the present invention is applied.
Figure 1B:
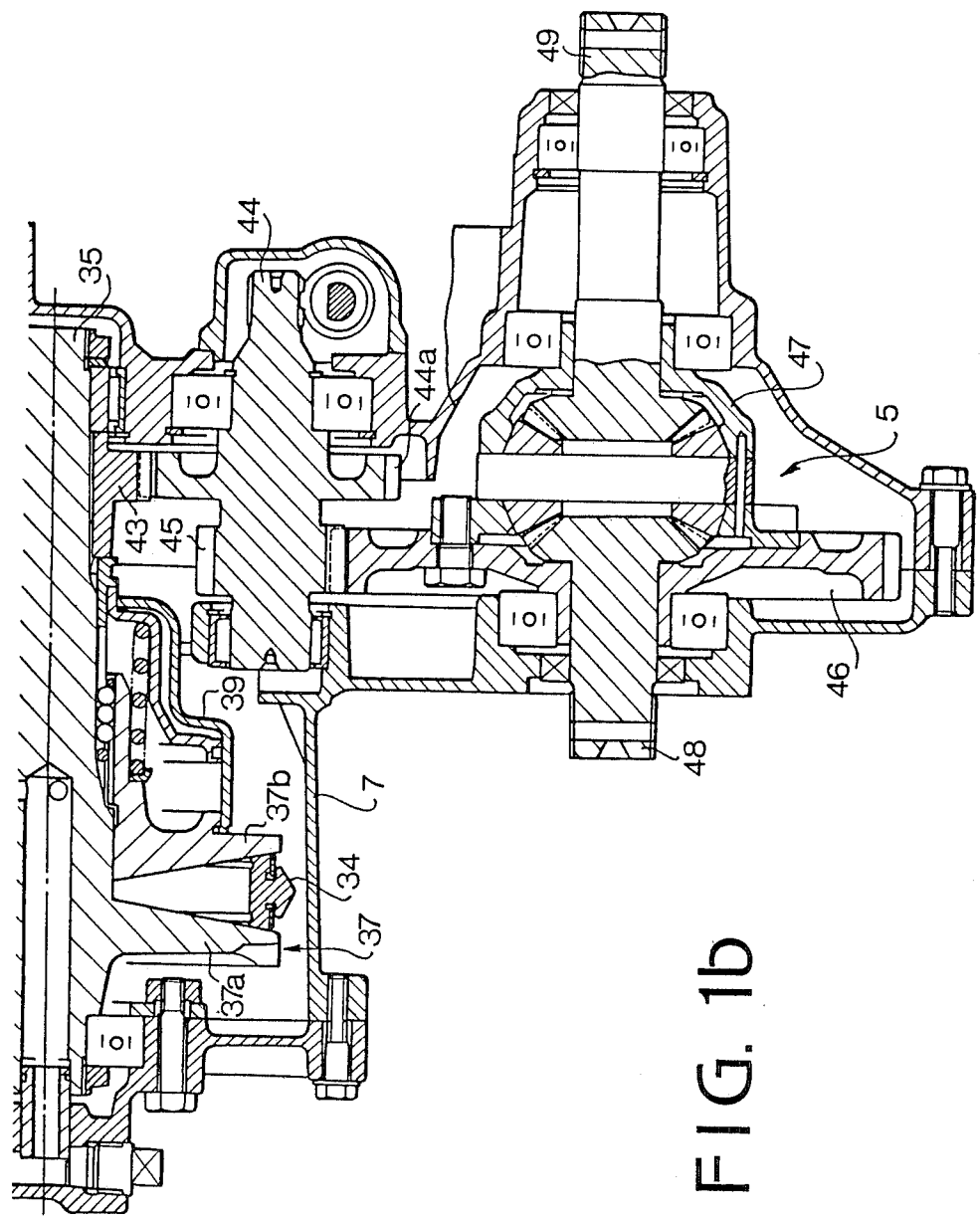

Referring to FIGS. 1a and 1b, a continuously variable belt-drive automatic transmission for a vehicle, to which the present invention is applied, comprises an electromagnetic powder clutch 1, a continuously variable belt-drive transmission 2. The CVT 2 has a selector device 3, pulleys and belt device 4, and final reduction device 5. The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1.

The electromagnetic powder clutch 1 comprises a driven member 14, a magnetizing coil 15 provided in the driven member 14. The driven member 14 has its outer periphery spaced from the inner periphery of the drive member 12 by a gap 16, and a powder chamber 17 is defined between the drive member 12 and driven member 14. Magnetic powder material is provided in the powder chamber 17. The driven member 14 is secured to an input shaft 13 of the CVT 2. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the CVT 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 as a synchromesh mechanism, which is mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

When the sleeve 29 is engaged with the gear 21, the input shaft 13 is connected to the main shaft 20 through the gear 21 and synchronizer 27 to provide driving positions. When the sleeve 29 is engaged with the gear 22, the input shaft 13 is connected to the main shaft 20 through gears 21, 24, 26 and 22 to provide a reverse driving position.

In the pulleys and belt device 4, the main shaft 20 has an axial passage in which an oil pump driving shaft 42 connected to crankshaft 10 is mounted. An output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder secured to the main shaft 20 to form a servo device 38. A chamber 38a of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. Movable conical disc 37b has a cylindrical portion in which a piston portion of the output shaft 35 is slidably engaged to form a servo device 39. A chamber 39a of the servo device 39 is communicated with the oil pump 41 through the pressure oil control circuit. A spring 40 is provided to urge the movable conical disc 37b to the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

A hydraulic control circuit is provided to respond to vehicle speed, engine speed and throttle valve position for controlling the oil from the oil pump 41 to servo devices 38 and 39 thereby to move discs 36b and 37b, as described hereinafter.

Figure 2A:
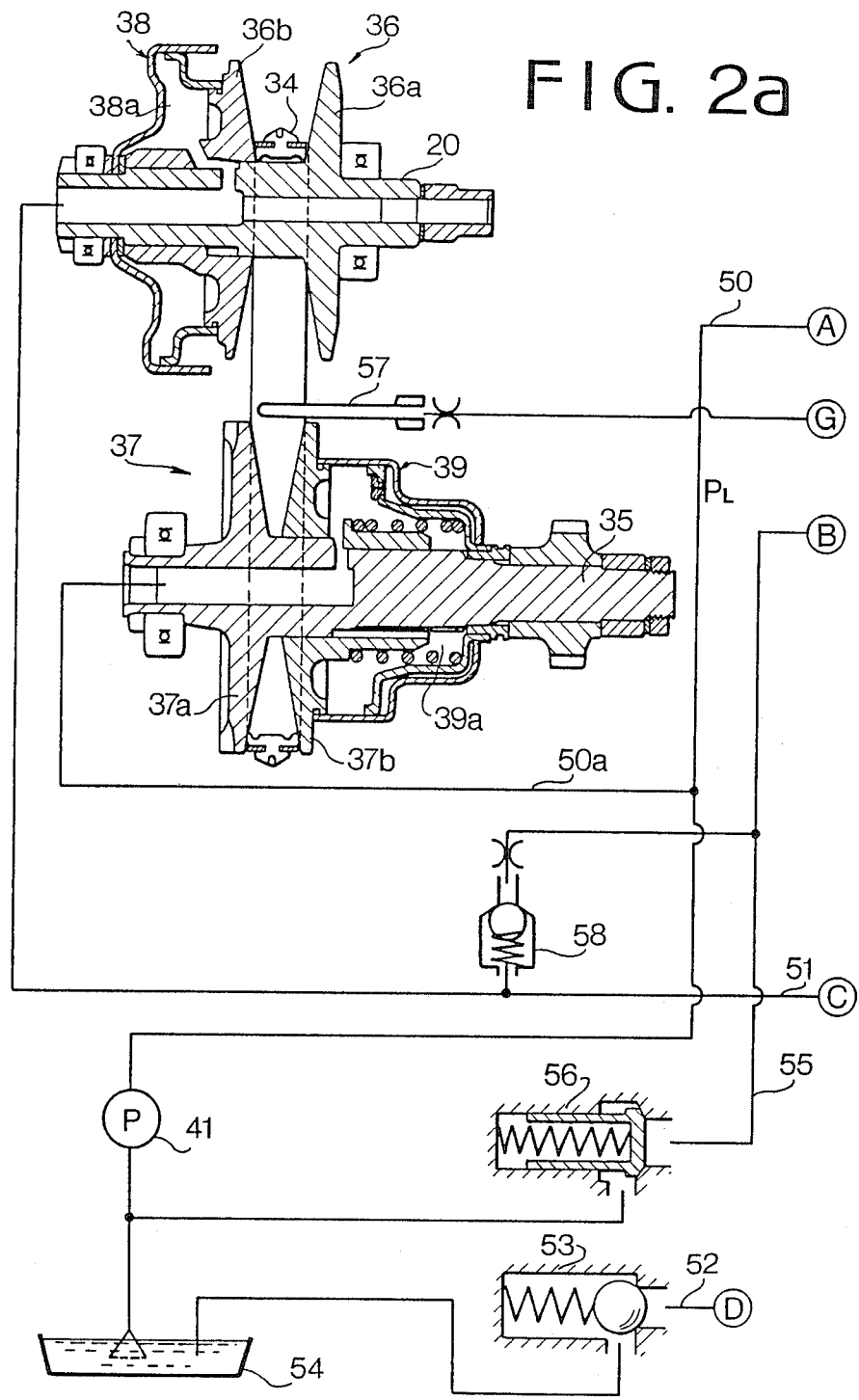
FIGS. 2a and 2b are hydraulic control circuits for the transmission.
Figure 2B:
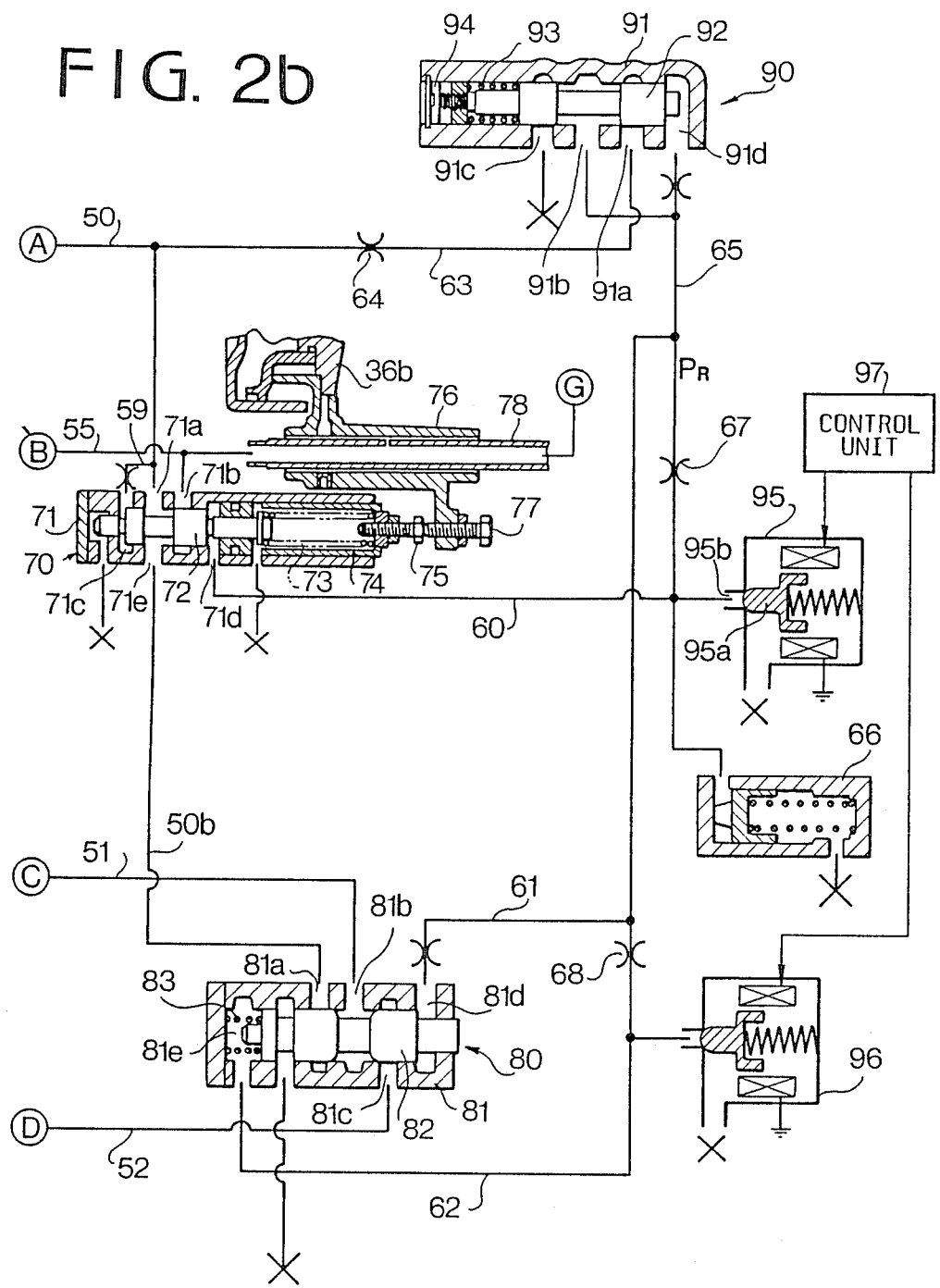

FIGS. 2a and 2b show an example of the hydraulic control circuit. The chamber 39a of the driven pulleys 37 is supplied with pressurized oil by an oil pump 41 from an oil reservoir 54 through a line pressure conduit 50a. The chamber 38a of drive pulley 36 is applied with pressurized oil passing through a line pressure conduit 50, ports 71a and 71e of a line pressure control valve 70, passage 50b, transmission ratio control valve 80, and conduit 51. The movable conical disc 36b of the drive pulley 36 is so designed that the pressure receiving area thereof is larger than that of movable conical disc 37b of the driven pulley 37.

The line pressure control valve 70 comprises a valve body 71, spool 72, and chambers 71c and 71d. The spool 72 is applied with pressure of the pressurized oil in the chamber 71c supplied through a conduit 59. The other end of the spool 72 is applied with the force of a spring 73 provided between the end of the spool 72 and a retainer 74, the position of which is adjustable by a screw 75. The port 71a is communicated with a drain port 71b for a drain passage 55 in accordance with the position of a land of the spool 72. The drain port 71b communicates with oil reservoir 54 through passage 55 and a lubricating oil pressure providing valve 56 in the form of a check valve. The passage 55 is further communicated with conduit 51 through a prefill valve 58. The adjust screw 75 screwed in the spring retainer 74 engages with a screw 77 screwed in a transmission ratio sensing shoe 76 which is slidably mounted on a lubricating oil tube 78. The sensing shoe 76 is slidably engaged with either of the movable conical discs 36b and 37b (disc 36b in the embodiment), so that the axial movement of the disc 36b is transmitted to the spool 72 through sensing shoe 76, screws 77, 75, spring retainer 74 and spring 73. A part of the oil in the passage 55 is supplied to the pulley 37 from a nozzle 57 passing through tube 78 to lubricate the pulley device.

The transmission ratio control valve 80 comprises a valve body 81, spool 82, and spring 83 for urging the spool 82 in the downshift direction. A port 81b of the valve body 81 is selectively communicated with a pressure oil supply port 81a or a drain port 81c in accordance with the position of lands of spool 82. The port 81b communicates with chamber 38a through conduit 51, and port 81a communicates with line pressure control valve 70 through conduit 50b. The drain port 81c is communicated with the oil reservoir 54 through a conduit 52 and check valve 53.

The system of the present invention is provided with a pressure reducing valve or pressure control valve 90, and solenoid operated on-off control valves 95 and 96.

The reducing valve 90 comprises a valve body 91, spool 92, ports 91a, 91b and 91c, and chamber 91d, and spring 93 urging the spool 92 to the chamber 91d. The load of the spring 93 can be adjusted by a retainer 94. The port 91a is connected to the conduit 50 by a conduit 63 having an orifice 64, and port 91b and chamber 91d are connected to a conduit 65. When the pressure in the conduit 65 reduces, the spool 92 is shifted to the right by spring 93, so that port 91a communicates with port 91b to increase the pressure in the conduit 65. Thus, a constant pressure of oil is provided in the conduit 65.

The conduit 65 is communicated with the chamber 71d of line pressure control valve 70 through an orifice 67 and a passage 60. The conduit 65 is also communicated with reservoir 54 through solenoid operated on-off valve 95 and with an accumulator 66. Further, the conduit 65 is communicated with an end chamber 81d of the transmission ratio control valve 80 through a passage 61 and with another end chamber 81e through a passage 62 having an orifice 68. The solenoid operated on-off valve 96 is connected to the passage 62 downstream of orifice 68 so as to drain the oil to the reservoir 54. The solenoid operated valve 95 is adapted to be operated by pulses. When energized, a valve 95a opens a drain port 95b. The solenoid operated valve 96 is the same as valve 95 in construction and operation. The solenoid operated valves 95 and 96 are operated by pulses from a control unit 97. Thus, control pressures applied to chambers 71d, 81e change by changing duty ratios of pulses supplied to the solenoid operated valves 95 and 96.

In the line pressure control valve 70, the relationship among spring load $F_S$ and line pressure PL, line pressure receiving area SL of the spool, control pressure $P_d$ at the chamber 71d and control pressure receiving area $S_d$ is as follows:

$$F_S + P_d \cdot S_d = PL \cdot SL$$

$$PL = (P_d \cdot S_d + F_s)/SL$$

Accordingly, the line pressure PL is proportional to the control pressure $P_d$.

Figure 3A:
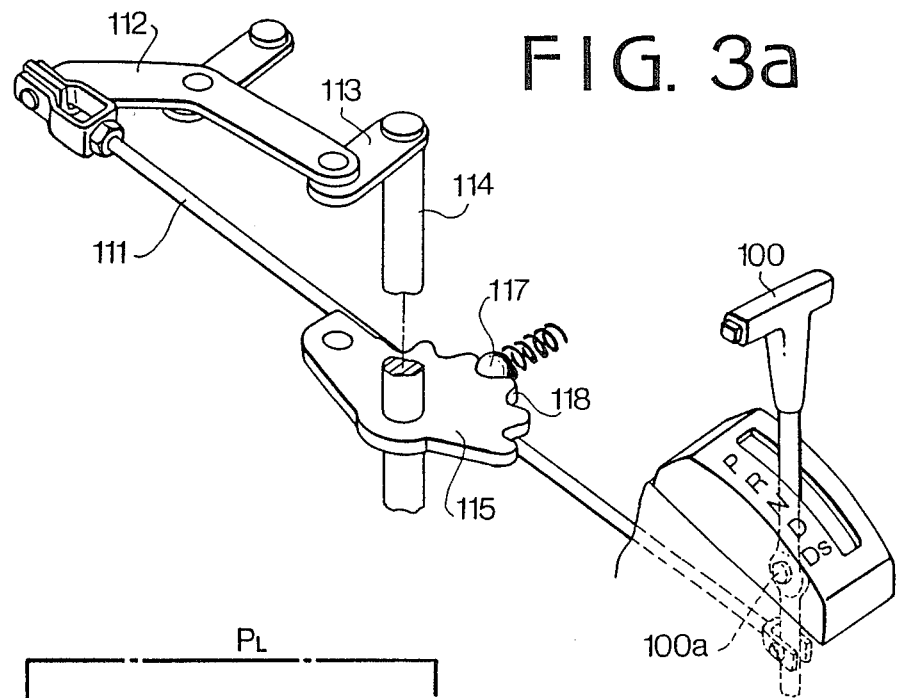
FIG. 3a perspective view showing a part of a selector mechanism according to the present invention.

The selector mechanism of the selector device 3 is hereinafter described referring to FIGS. 3a and 3b. As shown in FIG. 3a, a selector lever 100 is rotatably mounted on a shaft 100a and a lower end thereof is operatively connected to a vertical shaft 114 through a rod 111, levers 112 and 113 so as to rotate the shaft 114. A detent plate 115 having five indentations 118 is secured to the shaft 114 and a spring loaded positioning ball 117 engages with the detent plate so as to engage one of the indentations 118 in order to hold the shaft 114 at a selected angular position. The indentations 118 correspond to operational positions of P, R, N, D, and Ds.

Figure 3B:
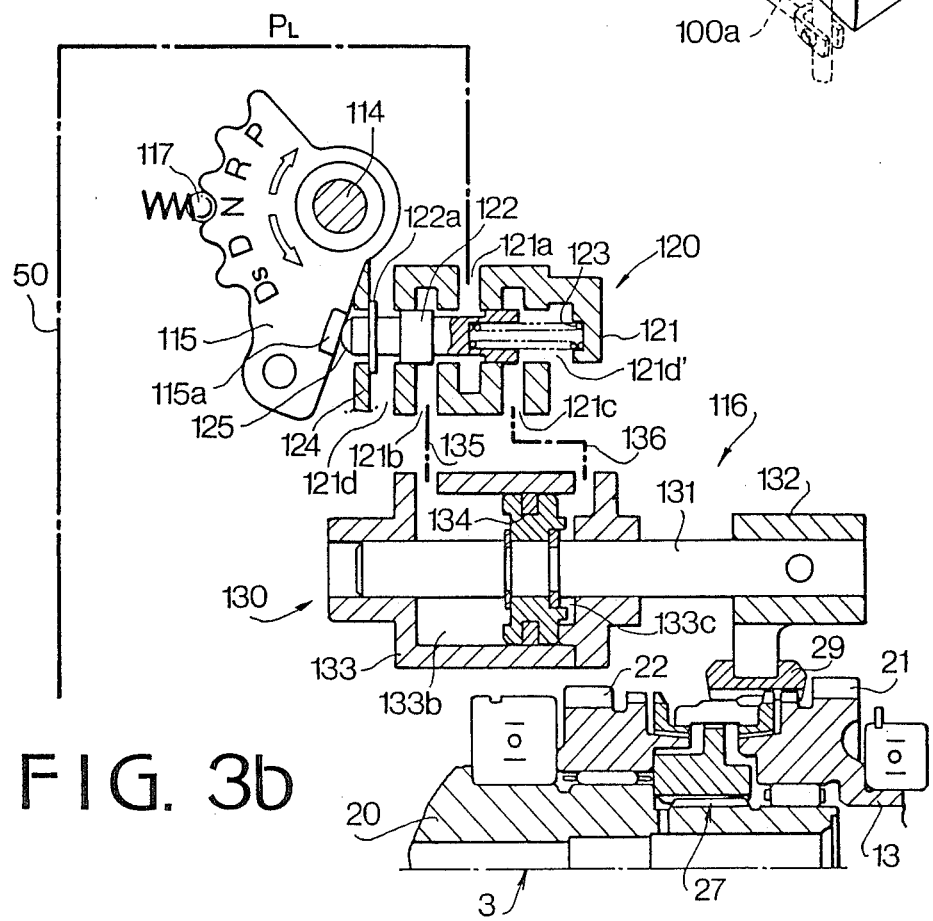
FIG. 3b is a sectional view showing an actuator provided on the selector mechanism.

Referring to FIG. 3b, an actuator 116 for operating the selector device 3 comprises a selector valve 120 and a servo valve 130. The detent plate 115 has a projection 115a for operating the selector valve 120.

The selector valve 120 comprises a valve body 121, a spool 122 having two lands, and return spring 123 urging the spool 122 to the detent plate 115. An end 125 of the spool 122 is engaged with the projection 115a of the detent plate 115, so that the spool 122 is axially moved by the rotation of the detent plate 115. The valve body 121 has an inlet 121a communicated with the line pressure conduit 50, a pair of outlet ports 121b, 121c, and a pair of drain ports 121d, 121d'. The inlet port 121a is selectively communicated with the outlet port 121b and 121c in accordance with the position of the respective land of the spool 122. A flange 122a is formed on an end portion of the spool 122 to be engaged with a stopper 124 of the valve body 121 for regulating the position of the spool 122 at the left end. For example, when the N range is selected as shown in FIG. 3b, the spool 122 is positioned at the left end where the flange 122a abuts on the stopper 124.

The servo valve 130 comprises a cylinder 133, a rod 131 slidably mounted in the cylinder 133, and a piston 134 securely mounted on the rod 131 in the cylinder 133. The rod 131 is disposed in parallel with the selector device 3. A fork 132 engaging with the synchronizer sleeve 29 of the selector device 3 is secured to the rod 131. The cylinder 133 has a chamber 133b and a chamber 133c defined by the piston 134. The chamber 133b is communicated with the outlet port 121b of the selector valve 120 through an oil passage 135, and the chamber 133c is communicated with the outlet port 121c through a passage 136. Thus, the piston rod 131 can be axially reciprocated by the operation of valve 120.

Figure 4:
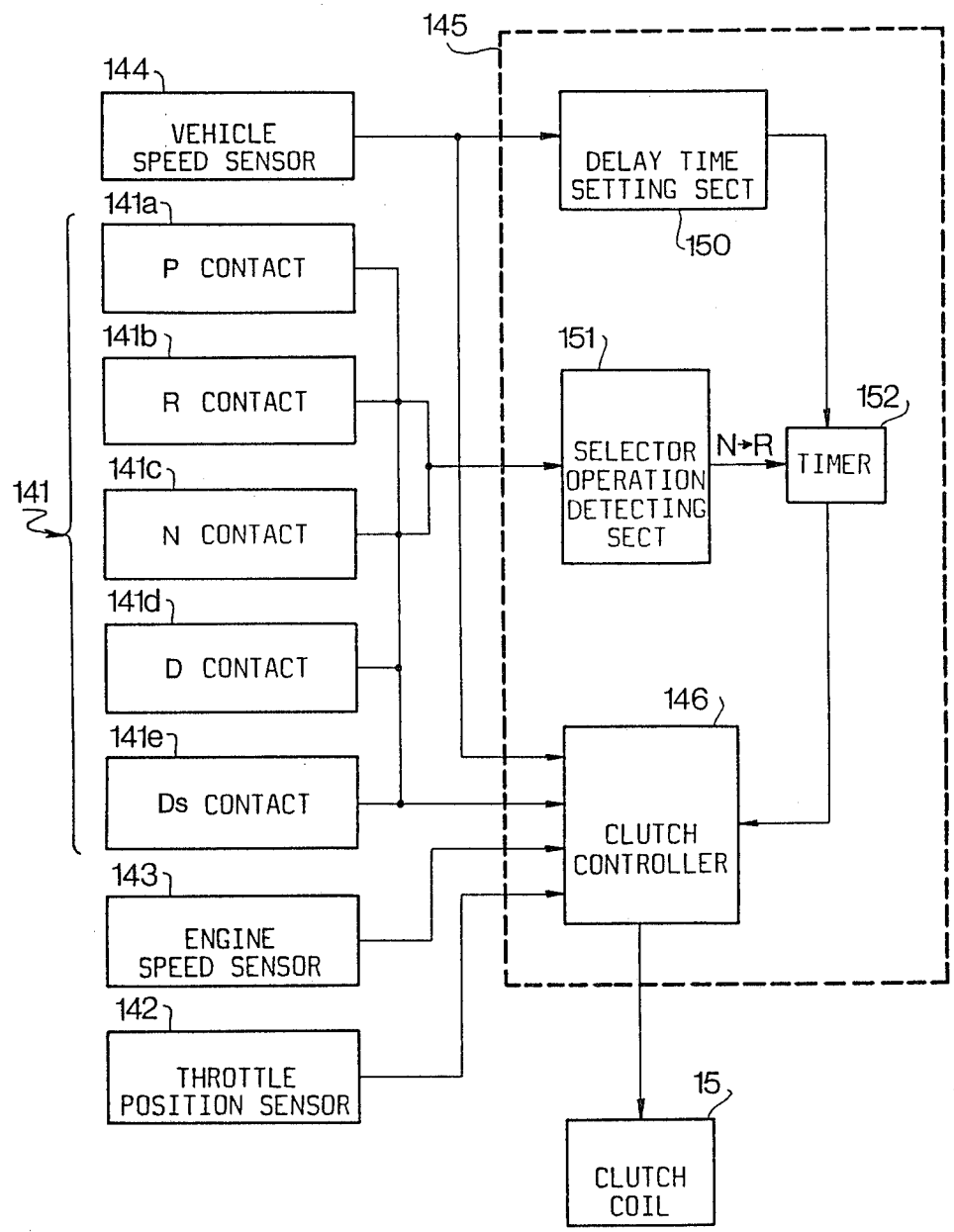
FIG. 4 is a block diagram showing a control unit for an electromagnetic clutch.

Referring to FIG. 4, a control unit 145 for the clutch 1 is provided with a selector range detecting switch 141 provided adjacent the selector lever 100 for detecting a selected range. The selector range detecting switch 141 has a P contact 141a, R contact 141b, N contact 141c, D contact 141d, and Ds contact 141e corresponding to respective ranges. Further, a throttle position sensor 142, an engine speed sensor 143, and a vehicle speed sensor 144 are provided. Output signals of these sensors and the switch are applied to a clutch controller 146 in the control unit 145. The clutch controller 146 produces an output signal which is fed to the clutch coil 15 for controlling the clutch current.

When the clutch controller 146 is applied with the signal of the P contact 141a or the N contact 141c, the controller controls to cut off the clutch current of the clutch coil 15 to release the clutch 1. When the signal of the R contact 141b, D contact 141d, or Ds contact 141e is applied to the controller 146, drag current flows in the clutch coil 15 to engage the clutch 1.

In accordance with the present invention, a delay time setting section 150 applied with a signal of the vehicle speed sensor 144 and a selector operation detecting section 151 applied with a signal from the selector range detecting switch 141 are provided in the control unit 145. Output signals of the sections 150, 151 are applied to a timer 152 to set a delay time. A signal of the timer 152 is applied to the clutch controller 146, for controlling the delay time of engagement of the clutch.

The delay time setting section 150 is provided for setting the start time at which the clutch starts to engage after the operation of the selector lever, as hereinafter described. A synchronizing time ts of the synchromesh, that is period of time spent for synchronizing the synchromesh, is represented as $$ts = f(\Delta n, p) \tag{1}$$

where $\Delta n$ is a difference between sleeve 29 and gear 21 or gear 22 in speed and p is the actuating force of the actuator 116. Since the actuating force p is constant, and the difference $\Delta n$ is approximately proportional to the vehicle speed V at the selector operation time, synchronizing time ts becomes $$ts = f(V) \tag{2}$$

The delay time t for engaging the clutch is determined to be a time slightly longer than the synchronizing time ts, that is, $$t = ts + \alpha = f(V) + \alpha \, (\alpha \text{ is a constant}) \tag{3}$$

Thus, the delay time t is determined as a function of the vehicle speed V. The delay time t is set to increase with increase of the vehicle speed V.

The selector operation detecting section 151 detects the selector operation in accordance with signals from the contacts of the switch 141. The spool 122 of selector valve 120 is shifted only when the selector lever 100 is shifted between the R position and the N position. When the selector lever is shifted from the R position to the N position, the drive range D is selected by the engagement of sleeve 29 and gear 21. However, at the same time, clutch current is cut off. Accordingly, in such a case, trouble does not occur, and hence detecting section 151 does not operate.

In operation, when the selector lever 100 is shifted along a straight line, the detent plate 115 is rotated about the shaft 114 to operate the selector valve 120. When the N range is selected as shown in FIG. 3b, the inlet port 121a communicates with the outlet port 121b and the outlet port 121c communicates with the drain port 121d'. The line pressure from the conduit 50 is applied to the chamber 133b of the cylinder 133 so that the piston rod 131 is shifted to the right in FIG. 3b. Thus, the sleeve 29 is moved to the right to engage with the gear 21. Accordingly, the input shaft 13 is connected to the main shaft 20 through the gear 21 and synchronizer 27 to provide a forward driving position.

In the control unit 145 responsive to the N range selection, the N contact 141c of the switch 141 is turned on, so that the controller 146 controls to cut off the clutch current of the clutch coil 15. Thus, the clutch 1 is disengaged from the engine. Accordingly, even if the selector device 3 is in the driving position, the power of the engine is not transmitted to the CVT.

When D range or Ds range is selected from the N range, the detent plate 115 rotates away from the selector valve 120 in the clockwise direction. Accordingly, spool 122 is not moved, staying in the position at N range. Namely, in N, D, and Ds ranges, the selector device 3 is kept in driving state.

When the D contact 141d or the Ds contact 141e is turned on, the controller 146 operates to cause the drag current to flow in the clutch coil 15. Thus, the clutch 1 is engaged by the drag current to transmit the engine power to the CVT.

When the R range is selected from the N, D or Ds range, the projection 115a of the detent plate 115 pushes the end 125 of the spool 122 to shift the spool 122 to the right. The inlet port 121 communicates with the outlet port 121c and the outlet port 121b communicates with the drain port 121d, so that the line pressure is applied to the chamber 133c. Thus, the piston rod 131 is shifted to the left in FIG. 3b. The sleeve 29 is moved to the left to engage with the gear 22. Accordingly, the reverse driving position is provided.

The selector operation detecting section 151 detects that the N contact 141c is turned off and the R contact 141b is turned on and produces a timer start signal. On the other hand, the delay time setting section 150 sets the delay time t to a value slightly longer than the synchronizing time ts in accordance with the equation (3).

When the vehicle is at a stop, the vehicle speed V in the equation (3) is zero.

When the P range is selected, the selector device 3 remains at the R range position. A parking lock mechanism (not shown) connected to the detent plate 115 is operated to lock one of the pulleys.

The operation of the CVT during the driving of the vehicle is the same as the system of the afore-mentioned EP-A-0151024. Therefore, the description of the operation is omitted.

From the foregoing, it will be understood that the present invention provides a selector mechanism in which a clutch is engaged after the selector mechanism is engaged by an actuator. Thus, trouble in the selector mechanism at the selection of operational ranges is avoided.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A control system for a selector mechanism for a vehicle provided with an electromagnetic clutch and a continuously variable transmission having a driving range, a reverse range, a neutral range, and a parking range, means including a synchronizer for selecting either of forward and reverse gears and a selector lever arranged to be shifted so as to perform the selection of the ranges, the system comprising:
   a hydraulic actuator responsive to the operation of the selector lever for operating the synchronizer for the selection of the ranges;
   detector means for detecting a selected range and for producing a range signal;
   control means responsive to said range signal for engaging the electromagnetic clutch, with a delay time, after engagement of the snychronizer.

2. The control system according to claim 1 further comprising a selector valve responsive to the operation of the selector lever for operating the hydraulic actuator.

3. The control system according to claim 1 wherein the delay time is a function of vehicle speed.

4. The control system according to claim 3, wherein the delay time increases with increase of the vehicle speed.

5. The control system according to claim 1, wherein said synchronizer has synchronizing time which is a function of vehicle speed, and
   said delay time equals said synchronizing time plus a short additional time.

6. The control system according to claim 5, wherein said short additional time is a constant, independent of vehicle speed.

* * * * *